Patented Sept. 30, 1930

1,777,173

UNITED STATES PATENT OFFICE

ARTHUR LIEBRECHT, OF FRANKFORT-ON-THE-MAIN, GERMANY, ASSIGNOR TO THE FIRM OF CHEMISCH-PHARMAZEUTISCHE CORPORATION OF BAD HOMBURG V. D. H., A CORPORATION OF GERMANY

PROCESS FOR THE PRODUCTION OF MEDICAMENTS CONTAINING BISMUTH

No Drawing. Application filed July 24, 1925, Serial No. 45,946, and in Germany July 29, 1925.

Bismuth and its compounds have proved to be excellent remedies for the treatment of syphilis. One of their disadvantages is however their slow action when treating syphilis at an early stage.

I have found that the intensity of the action of bismuth and bismuth compounds may be enhanced considerably by combining them with phosphatides, for instance lecithin. By reacting the mentioned components I have got phosphatide-bismuth combinations, the qualities of which are quite different from those of the original materials; especially the therapeutical effect of such combinations will be considerably increased in contradistinction to such bismuth preparations not containing phosphatides. This was noticed in comparative tests made in different hospitals. It can also be seen from the following examples, which show for instance that the increase of the effect of bismuth complemented by the addition of lecithin is threefold, i. e. one third of the quantity of the lecithin-bismuth compound is sufficient to produce the same degree of the treponemicidal effect as one unit of the bismuth oxyiodide which has not been exposed to the action of lecithin.

Eventually bismuth or a bismuth compound may also be combined with several phosphatides or several different substances containing bismuth with several phosphatides. The reaction between phosphatides and bismuth or bismuth compounds may be promoted by the presence of organic solvents such as chloroform, carbon bisulfide, benzene, ether etc., which solvents may be removed when the formation of the phosphatide bismuth combinations is achieved.

When it is intended to employ the phosphatide-bismuth addition products for injections, they may be applied in combination with suitable oils, such as paraffine oils, olive oil and the like. For this purpose also oils containing phosphatides may be used, such as soja oil.

For the preparation of such solutions adapted for injections a ready-made mixture containing phosphatides and bismuth compounds may for instance be dissolved in an organic solvent such as chloroform, and the oil added afterwards. Or, dispensing with the organic solvent, the phosphatide is dissolved in the oil and this solution mixed with the suspension of the bismuth compound in another quantity of the oil. The amount of solution of the phosphatide in the oil may be considerably increased by addition of substances such as terpenes, for instance eucalyptol, linalol, which do not in any way interfere with the formation of the phosphatide bismuth products nor with their therapeutical application.

Besides phosphatides there may also be used other substances with high dispersing qualities, forming with bismuth compounds highly dispersed, lipoid soluble combinations and facilitating at the same time the therapeutic action of the bismuth compounds by their own physiological effect.

I give the following examples to show how my invention may be carried into effect, but I wish it to be understood that I do not want to be limited by them.

Example 1

Molecular proportions of bismuth quinine iodide and lecithin dissolved in ether are thoroughly mixed, whereupon the ether is removed by evaporation. An orange substance remains which can be pulverized and is soluble in chloroform, carbon bisulfide, benzene and also in ether. The solution may be facilitated by moderate heating. It is remarkable to observe that the bismuth-phosphatide combinations easily dissolve in chloroform, while bismuth quinine iodide per se is almost insoluble in organic solvents. The obtained solution is filtered, and the filtrate is then freed from chloroform. The resulting pulverized product is of a yellow-red colour and contains about 11.3% of bismuth.

Example 2

One part of the bismuth salt of a cholic acid prepared for instance of a raw cholic acid obtained from a bile extract, and two parts of lecithin are triturated together very thoroughly. A semi-solid mass is produced which is easily soluble in organic solvents such as benzene, chloroform, carbon bisulfide and the like. The product obtained contains 6.3% of bismuth. The starting material, the bismuth salt of the cholic acid, is completely insoluble in organic solvents in contrast to its lecithin compound.

*Example 3*

9.5 parts of bismuth salt of the 2-phenyl-quinoline-4-carbonic acid are added to a solution of 7.5 parts of lecithin in 100 cc. of benzene. When standing at an ordinary temperature, complete solution is obtained after a certain time, which may be shortened considerably by heating the mixture to a moderately increased temperature, for instance from about 30–40° centigrade, the liquid assuming a reddish-brown shade. The solvent is distilled off at 30–40° centigrade. The viscous syrup-like residue solidifies after a short time and becomes capable of being pulverized. Whilst the bismuth salts of the phenylquinoline carbonic acid are quite insoluble in benzene, carbon bisulfide, eucalyptol and the like, bismuth salt-lecithin combination products may be easily dissolved in the mentioned solvents. The obtained product contains 12.82% of bismuth.

*Example 4*

Molecular quantities of the bismuth salt of the trichlorobutylester-malonic acid, and of lecithin dissolved in ether are mixed, whereupon the whole salt is almost completely dissolved. After filtration and distillation of the ether a semi-solid mass remains which is soluble in nearly all organic solvents to a clear solution, whilst the bismuth salt alone, which has been used as starting material, is scarcely soluble in ether etc. The bismuth content of the new product is about 12.6%. The quantity of the phosphatides and other substances combined with bismuth or bismuth compounds may vary within wide limits.

The products according to the invention have a great therapeutical value; they are especially adapted for treating the late forms of syphilis.

Claims:

1. A method for making bismuth containing medicaments which consists in reacting bismuth containing compounds with lecithin.

2. A method for making bismuth containing medicaments which consists in reacting bismuth containing compounds with lecithin and in combining the obtained reaction products with oils suitable for injections.

3. As a new article of manufacture addition compounds of bismuth containing compounds and lecithin.

4. As a new article of manufacture addition compounds of bismuth containing compounds and lecithin in mixture with an oil suitable for injections.

5. As a new article of manufacture addition compounds of bismuth containing compounds and lecithin in mixture with an oil suitable for injections and eucalyptol.

6. The method of preparing a bismuth containing medicament which comprises reacting together bismuth quinine iodide and lecithin in an organic solvent.

7. As a new material, the addition product of bismuth quinine iodide and lecithin.

In testimony whereof I affix my signature.

Dr. ARTHUR LIEBRECHT.